(12) United States Patent
Curtis et al.

(10) Patent No.: US 7,877,506 B2
(45) Date of Patent: Jan. 25, 2011

(54) SYSTEM, METHOD AND PROGRAM FOR ENCRYPTION DURING ROUTING

(75) Inventors: Richard S. Curtis, Fort Collins, CO (US); Jason D. Forrester, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 11/442,563

(22) Filed: May 26, 2006

(65) Prior Publication Data

US 2007/0276958 A1 Nov. 29, 2007

(51) Int. Cl.
*G06F 15/173* (2006.01)

(52) U.S. Cl. ...................................... 709/238
(58) Field of Classification Search ........................ None
See application file for complete search history.

(56) References Cited

U.S. PATENT DOCUMENTS

| | | | | |
|---|---|---|---|---|
| 6,732,273 | B1 | 5/2004 | Byers | 713/193 |
| 7,080,148 | B2 * | 7/2006 | Weigand | 709/228 |
| 7,165,175 | B1 * | 1/2007 | Kollmyer et al. | 713/154 |
| 7,266,683 | B1 * | 9/2007 | Nag | 713/154 |
| 2002/0162114 | A1 * | 10/2002 | Bisher et al. | 725/91 |
| 2004/0172464 | A1 * | 9/2004 | Nag | 709/223 |
| 2004/0210892 | A1 | 10/2004 | Sharma | 717/168 |
| 2004/0225879 | A1 | 11/2004 | Nelson | 713/153 |
| 2004/0243567 | A1 | 12/2004 | Levy | 707/3 |
| 2005/0053074 | A1 * | 3/2005 | Wybenga et al. | 370/395.43 |
| 2005/0091661 | A1 | 4/2005 | Kurien et al. | 719/310 |
| 2005/0175184 | A1 * | 8/2005 | Grover et al. | 380/278 |
| 2006/0041761 | A1 * | 2/2006 | Neumann et al. | 713/189 |
| 2006/0095969 | A1 * | 5/2006 | Portolani et al. | 726/23 |
| 2008/0186897 | A1 * | 8/2008 | Rune et al. | 370/315 |

* cited by examiner

*Primary Examiner*—Ario Etienne
*Assistant Examiner*—Clayton R Williams
(74) *Attorney, Agent, or Firm*—Arthur J. Samodovitz

(57) ABSTRACT

Computer system, method and program for routing. A non-encrypted message packet is received. In response, a payload in the message packet is read to determine if the payload contains sensitive information. If the payload contains sensitive information, the message packet is encrypted and subsequently, routed to a nonsecure communication path. If the payload does not contain sensitive information, the message packet is routed to a nonsecure communication path without encrypting the message packet. The payload can be read to determine if it contains sensitive information by determining a standard for a format of the message packet, and based on the standard, determining a location of data within the message packet and a type of the data at the location.

14 Claims, 3 Drawing Sheets

SYSTEM, METHOD AND PROGRAM FOR ENCRYPTION DURING ROUTING

FIELD OF THE INVENTION

The present invention relates generally to network routing and encryption, and more specifically to encryption during routing.

BACKGROUND OF THE INVENTION

Computer networks such as the Internet are well known today. Such networks include communication media, firewalls, routers, network switches and hubs. Networks often interconnect client computers and servers. In the case of communications through the Internet, typically there are many routers and many possible routing paths between a source computer and a destination computer. When a message arrives at a router, the router makes a decision as to the next router or "hop" in a path to the destination. There are many known algorithms for making this decision, such as OSPF, RIP, IGRP, EIGRP, ISIS or BGP. Generally, the routing decisions attempt to route the message packets to the destination via the shortest number of hops.

However, the router may consider other factors as well. For example, if the message is sensitive, such as containing confidential data, and is not encrypted, it may need to be encrypted before transmission onto a nonsecure network. It was known to forward an unencrypted message to a virtual private network where the message is encrypted. Then, the message is forwarded to a router to make a known, shortest-hop routing decision based on OSPF, RIP, IGRP, EIGRP, ISIS or BGP. While the router can detect if a message is encrypted, it is more difficult to determine if the message contains sensitive data. Consequently, if the router receives an unencrypted message, it may automatically forward the message to a virtual private network for encryption without regard for whether the message contains sensitive data. In those cases where the messages do not contain sensitive data, this burdens the virtual private network and its encryption device, and also slows the propagation of the message.

U.S. Pat. No. 6,732,273 discloses that a sender of a message generates a message characterization code and attaches it to each message packet, apart from the body of the message packet. When a router receives the message packet, it reads the message characterization code. If the code indicates that the message requires secure communication (typically if the data in the payload is sensitive and not encrypted), then the router propagates the message packet in a secure manner such as by encryption or other secure path. However, if the code indicates that the message is not sensitive (typically if the data in the payload is not sensitive, or is sensitive but encrypted), then the router propagates the message packet along the shortest path, typically through the nonsecure Internet. While this technique is effective, it requires that the sender of the message generate the message characterization code.

An object of the present invention is to enable a network device such as a router to determine whether a message contains unencrypted sensitive data, without requiring a message characterization code of the foregoing type.

SUMMARY OF THE INVENTION

The present invention resides in a computer system, method and program for routing. A nonencrypted message packet is received. In response, a payload in the message packet is read to determine if the payload contains sensitive information. If the payload contains sensitive information, the message packet is encrypted and subsequently, routed to a nonsecure communication path. If the payload does not contain sensitive information, the message packet is routed to a nonsecure communication path without encrypting the message packet.

In accordance with a feature of the present invention, the message packet is encrypted in a virtual private network.

In accordance with another feature of the present invention, the payload is read to determine if it contains sensitive information by determining a standard for a format of the message packet, and based on the standard, determining a location of data within the message packet and a type of the data at the location.

DETAILED DESCRIPTION OF THE PREFERRED EMBODIMENTS

Figure 1:
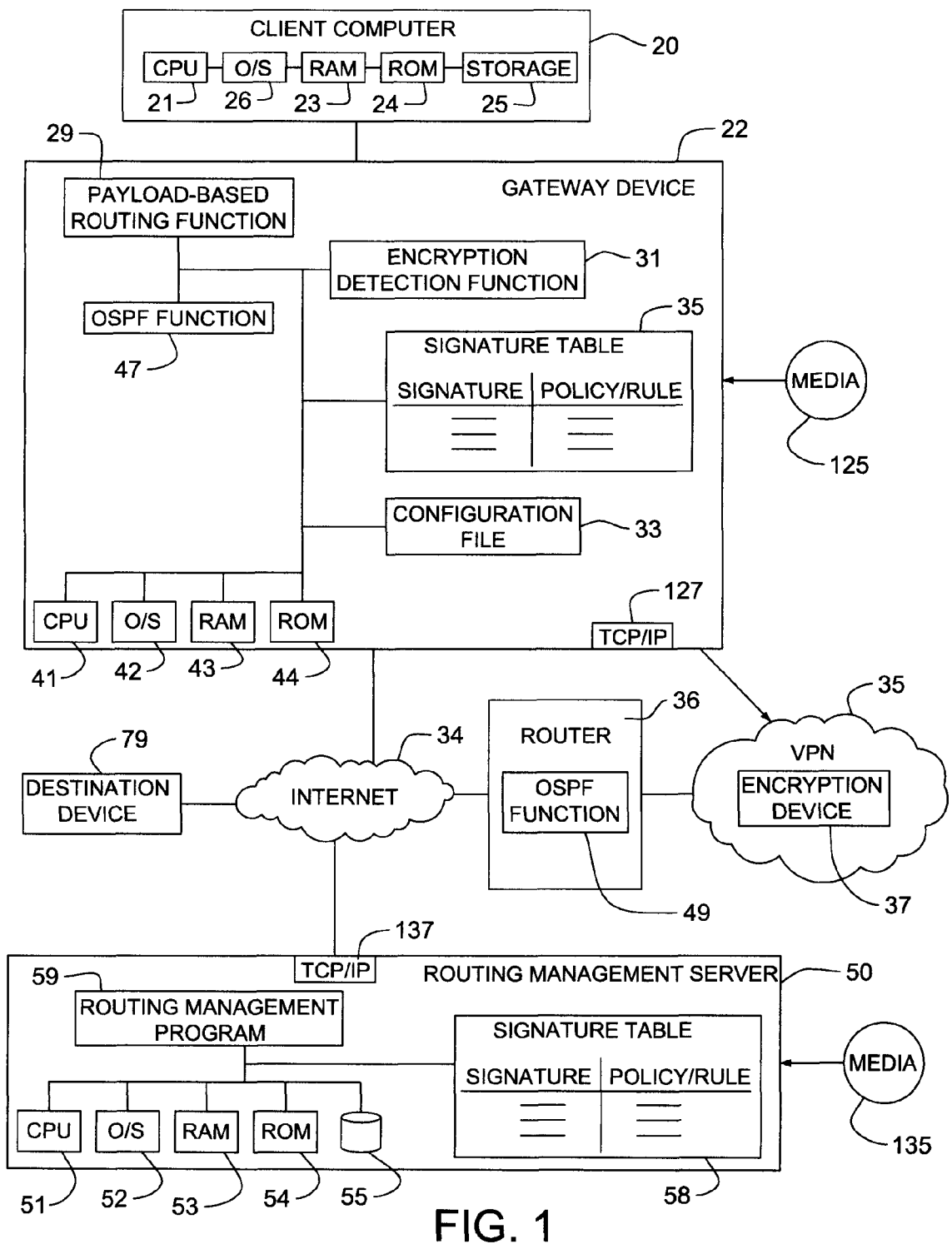
FIG. 1 is a block diagram of a distributed computer system including a network gateway device and a routing management server which embody the present invention.

The present invention will now be described in detail with reference to the figures. FIG. 1 illustrates a distributed computer system generally designated 10 in which the present invention is embodied. System 10 comprises a client computer 20, a gateway device 22 to interface to an nonsecure network 34, a virtual private network ("VPN") 35 with an encryption device 37, and a network router 36 to interface to nonsecure network 34 such as the Internet. Client computer 20 can be a workstation or server (for example, web server, production server, etc.) and includes a known CPU 21, operating system 26, RAM 23, ROM 24 and storage 25. Gateway device 22 can be a known network switch, router or firewall. Gateway device 22 includes a known shortest-path routing function such as OSPF, RIP, IGRP, EIGRP, ISIS or BGP. Gateway device 22 also includes a known CPU 41, operating system 42, RAM 43 and ROM 44. In accordance with the present invention, gateway device 22 also includes a payload-based routing function 29, implemented in hardware and/or software, which determines in most cases whether a secure communication, such as by encryption, is needed for message packets that it receives. Also in accordance with the present invention, system 10 includes a routing management server 50 with a routing management program 59 which determines whether a secure communication, such as by encryption, is needed for message packets in those cases where the gateway device 22 cannot make this decision or is configured to request the determination from server 50. Server 50 also includes a known CPI 51, operating system 52, RAM 53, ROM 54 and storage 55.

Function 29 in gateway device 22 includes known hardware and/or software encryption-detection function 31 to determine if a message is encrypted. Function 31 determines if a message is encrypted by examining the message for a signature characteristic of encryption such as whether the message contains ISAKMP, IPSEC, or ESP headers which are characteristic of encryption. If the message is encrypted (regardless of whether it includes sensitive information), then a nonsecure communication can be used, for example, via the Internet without encryption.

In the case of unencrypted information, function 29 of gateway device 22 looks inside the payload to determine the nature of the information, i.e. whether it is sensitive or nonsensitive. Based on a standard for the locations and types of data in the communication, function 29 knows where to look for the data in the payload and, in most cases, knows whether the data is sensitive or nonsensitive. For this purpose, function 29 maintains a list of sensitive types of data and a text string which represents their signature. If the message is unencrypted and contains sensitive information, then a secure communication should be used, such as by encryption. In such a case, gateway device 22 forwards the message packets to virtual private network 35 where it is encrypted by encryption device 37. Next, encryption device 37 forwards the encrypted message packet to router 36 which determines a next hop based on a known shortest-path routing algorithm such as OSPF, RIP, IGRP, EIGRP, ISIS or BGP. Then, router 36 forwards the message packets to the next hop in the Internet. If the message is unencrypted but does not contain sensitive information, then a nonsecure communication can be used, such as via the Internet without encryption. In such a case, known router function 47 in gateway device 22 determines the next hop based on a known routing algorithm such as OSPF, RIP, IGRP, EIGRP, ISIS or BGP, and then forwards the message packets to the next hop in the Internet. Gateway device 22 also includes a known CPU 41, operating system 42, RAM 43, and ROM 44. As noted above, in some cases, gateway device 22 cannot determine if an unencrypted message contains sensitive data or otherwise requires a secure communication. For example, in some cases, the gateway device 22 may not have a record of the text string or signature of the data in table 35. In other cases, the gateway device may be configured (by configuration file 33) to always solicit a determination from routing management server 50 whether unencrypted data is sensitive.

In a typical scenario, client computer 20 sends a message to gateway device 22. The message includes a header with a source IP address, a destination IP address (for example, of destination device 79), source port number and destination port number. The message also includes a payload, separate from the header, containing data. A TCP/IP adapter card 27 within client computer 20 packetizes the messages according to the OSI model. Gateway device 22 receives the message packets, and routing function 29 determines where to forward the message packets, as explained above.

Figure 2:
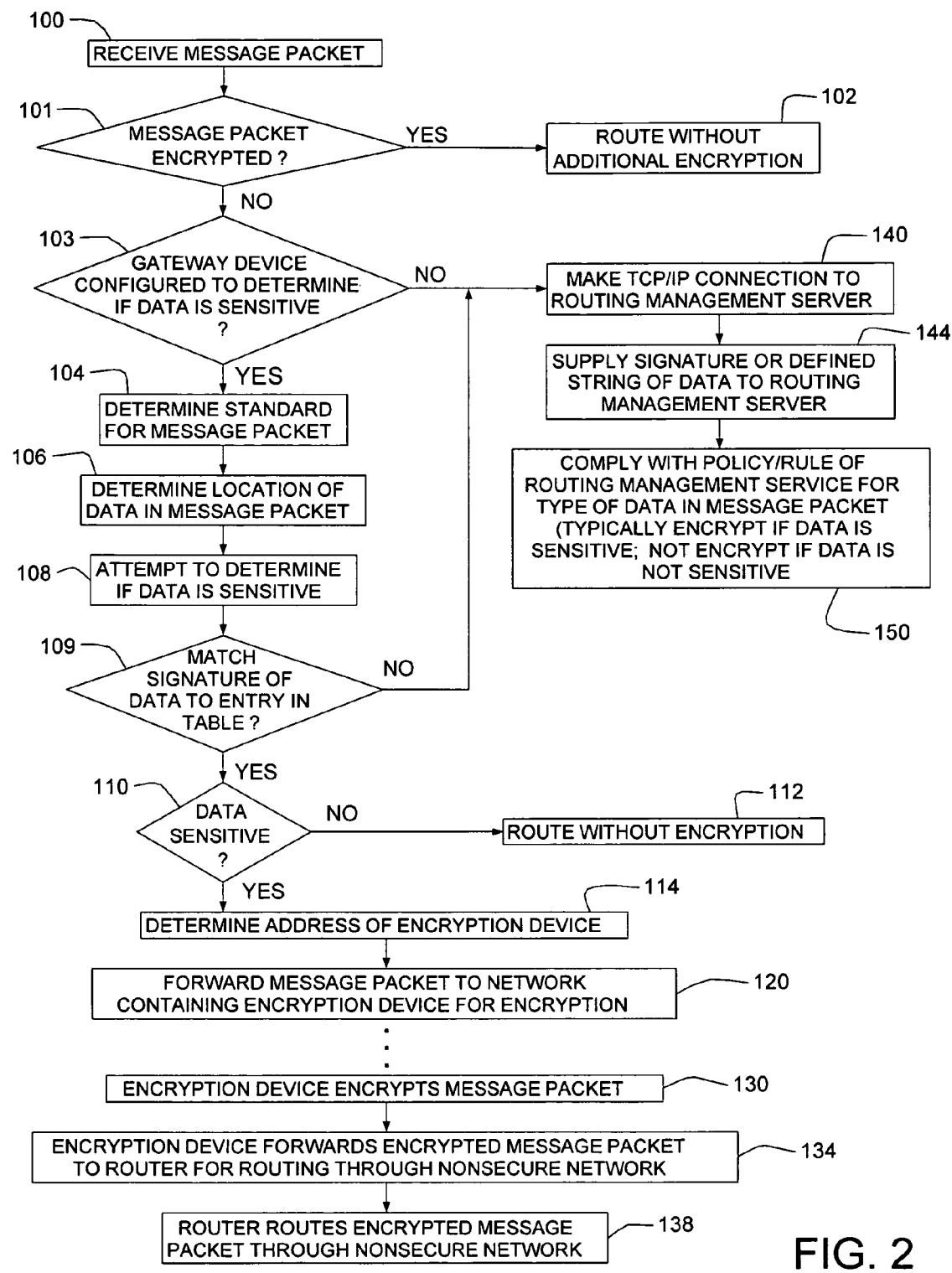
FIG. 2 is a flow chart of a payload-based routing function, implemented in hardware and/or software, within the gateway device of FIG. 1.

FIG. 2 illustrates processing by routing function 29 in gateway device 22 in more detail, according to the present invention. Upon receipt of each message packet (step 100), gateway device 22 determines if the packet is encrypted (decision 101). Gateway device 22 determines if the packet is encrypted by scanning the packet for a signature characteristic of an encryption algorithm. If the packet is encrypted (decision 101, yes branch), then gateway device 22 uses a known routing hardware and/or software function/algorithm 47 such as OSPF, RIP, IGRP, EIGRP, ISIS or BGP to determine the next router/hop in a path in the Internet to the destination IP address and then forwards the message packet to this next router/hop (step 102). If the packet is not encrypted (decision 100, no branch), then gateway device 22 determines if it is configured to determine if the data is sensitive (decision 103). If so (decision 103, yes branch), then gateway device 22 determines the standard which governs the format of the message packet, i.e. the syntax and location of the different segments or fields of the packet (step 104). Gateway device 22 determines the standard of the packet by reading the IP header. Next, based on the applicable standard for the message packet, gateway device 22 determines the location of the data in the payload (step 106). For example, the IP standard specifies that data used to classify the packet as an IP packet is located within the first 15 bytes of a packet. The IPX standard specifies that data used to classify the packet as an IPX packet is located within the first 20 bytes of the packet. Next, gateway device 22 attempts to determine if the data is sensitive (assuming the gateway device is configured to attempt this determination) (step 108). Gateway device 22 attempts to determine whether the data is sensitive based on a match of the signature of data within the payload to an entry in table 35. For example, based on the FTP standard, control packets may carry password information that indicates that the data (such as password information) is sensitive, SMB login type packets indicate that the data contains login credentials which are sensitive, and FTP directory control indicates that the data contains file control information which is not sensitive. If the gateway device is able to match the signature of the data to an entry in table 35 (decision 109, yes branch), then gateway device responds based on the nature of the data and the corresponding policy/rule in table 35. Typically, if the data is not sensitive (decision 110, no branch), then gateway device 22 uses known routing function/algorithm 47 such as OSPF, RIP, IGRP, EIGRP, ISIS or BGP as in step 102 to determine the next router/hop in a path in the Internet to the destination IP address, and then forwards the message packet to this next router/hop without encryption (step 112). Typically, if the data is sensitive (decision 110, yes branch), then gateway device 22 determines from its configuration file 33 the IP address of a network containing an encryption device (step 114). In the illustrated example, the configuration file 33 indicates VPN 35 as containing encryption device 37. So, gateway device 22 forwards the message packet to VPN 35 (step 120) where encryption device 37 encrypts the message packet (step 130). Next, encryption device 37 forwards the encrypted message packet to router 36 having a known hardware and/or software routing function 49 (step 134). Function 49 in router 36 determines the next hop of the encrypted message packet in Internet 34 by OSPF, RIP, IGRP, EIGRP, ISIS or BGP. Next, router 36 forwards the encrypted message packet to the next hop/router, and the message packet proceeds in a known manner via other network devices to the destination IP address (step 138).

In some cases, gateway device 22 is not configured to attempt to determine whether the unencrypted data is sensitive (decision 103, no branch) or does not have an entry in table 35 for the unencrypted data (decision 109, no branch). In either case, gateway device 22 requests a determination from routing management server 50 whether the unencrypted data is sensitive and therefore, requires encryption. To begin this process, gateway device 22 makes a TCP/IP connection to routing management server 50 and supplies authentication credentials (such as user ID and password) (step 140). Next, as described below with reference to FIG. 3, gateway device 22 sends to server 50 a signature or defined string of data in the payload of the message packet to enable the server 50 to determine if the data is sensitive (step 144).

Figure 3:
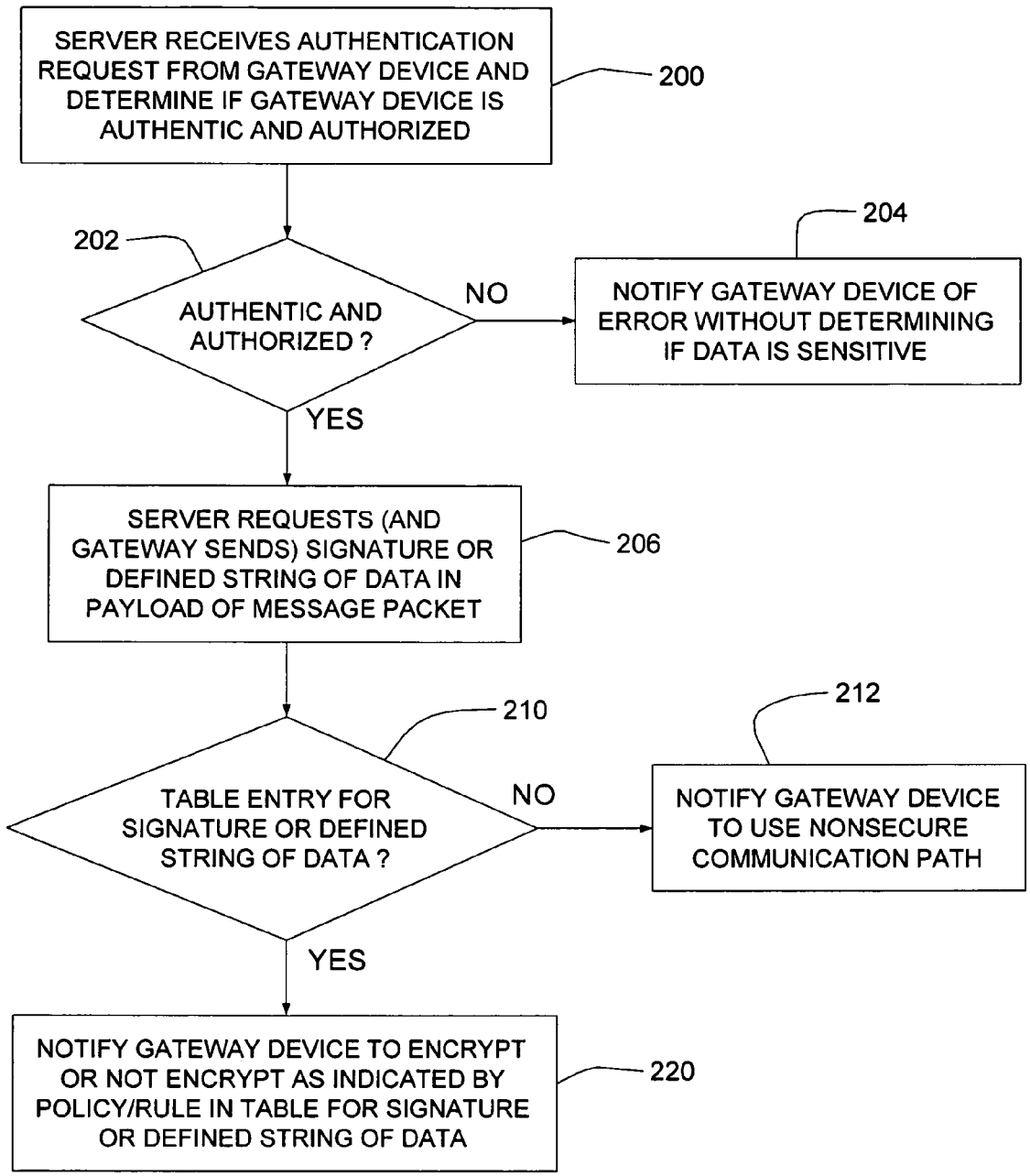
FIG. 3 is a flow chart of a routing management program within the routing management server of FIG. 1.

FIG. 3 illustrates function and use of routing management program 59 in routing management server 50 in more detail. In step 200, in response to the authentication request from gateway device 22, server 50 determines if gateway device 22 is authentic and authorized to access server 50 (decision 202). If not (decision 202, no branch), server 50 returns an error notice to gateway device 22 (step 204) (and does not assist in the routing decision). If gateway device 22 is authentic and authorized (decision 202, yes branch), then server 50 requests and gateway device 22 sends to server 50 a signature or defined string of the data in the payload of the message packet (step 206). In response, server 50 determines from a local table 58 whether there is an entry for this signature or defined string of data, and a predefined policy or rule for this signature or defined string (decision 210). Table 58 lists various signatures and defined strings of data in one column and the corresponding policy/rule in the same row in the next column. Each policy or rule indicates whether the data is sensitive and if so, whether to encrypt the data. Optionally, table 58 lists the IP address of VPN 35 or other network where the encryption can occur. Otherwise, gateway device 22 has a record of the IP address of VPN 35 or other network where the encryption can occur. (Optionally, a policy/rule can also require a specified quality of service such as bandwidth). If there is no policy/rule for the signature or defined string for the message packet (decision 210, no branch), then server 50 notifies gateway device 22 to use the standard routing algorithm, such as OSPF, RIP, IGRP, EIGRP, ISIS or BGP (step 212). However, if there is a policy/rule for the signature or defined string of data from the current message packet (decision 210, yes branch), then server 50 notifies gateway device 22 as to the policy/rule for the message packet, for example, to forward the message packet to VPN 35 for encryption (step 220). Gateway device 22 complies with the policy/rule in the notification from server 50 (step 150 of FIG. 2).

The function of gateway device 22 illustrated in FIG. 2 can be implemented in hardware and/or software. To the extent the function can be implemented in software, it can be loaded into gateway device 22 from a computer readable media 125 such as magnetic tape or disk, optical media, DVD, semiconductor media, memory stick, etc. or downloaded from the Internet via TCP/IP adapter card 127.

The function of server 50 illustrated in FIG. 3 can be implemented in hardware and/or software. To the extent the function can be implemented in software, it can be loaded into server 50 from a computer readable media 135 such as magnetic tape or disk, optical media, DVD, semiconductor media, memory stick, etc. or downloaded from the Internet via TCP/IP adapter card 137.

Based on the foregoing, a system, method and program product for encryption during routing have been disclosed. However, numerous modifications and substitutions can be made without deviating from the scope of the present invention. For example, Quality of Service ("QoS") information or other preferential routing treatment can be applied based on encryption state. Therefore, the present invention has been disclosed by way of illustration and not limitation, and reference should be made to the following claims to determine the scope of the present invention.

What is claimed:

1. A method for routing, said method comprising the steps of:

a gateway device receiving a nonencrypted message packet, and in response, reading a payload in said nonencrypted message packet to determine if said payload contains sensitive information, and if so, said gateway device initiating encryption of said nonencrypted message packet and further comprising the subsequent step of routing the encrypted message packet via a nonsecure communication path toward an intended destination of said nonencrypted message packet, if not, said gateway device routing said nonencrypted message packet via a nonsecure communication path toward said intended destination of said nonencrypted message packet without initiating encryption of said nonencrypted message packet; and wherein the step of said gateway device reading a payload in said nonencrypted message packet to determine if said payload contains sensitive information comprises the steps of said gateway device determining that said payload contains a login credential, and in response, said gateway device determining that said payload contains sensitive information.

2. A method as set forth in claim 1 further comprising the steps of:

said gateway device receiving another, encrypted message packet, and in response, routing said other message packet via a nonsecure communication path toward an intended destination of said other message packet without initiating further encryption of said other message packet.

3. A method as set forth in claim 1 wherein said encryption of said nonencrypted message packet is performed in a virtual private network and said payload contains sensitive information, and in response to said payload containing sensitive information, further comprising the step of said gateway forwarding said nonencrypted message packet to said virtual private network for encryption.

4. A method as set forth in claim 1 wherein the step of said gateway device reading said payload in said nonencrypted message packet to determine if said payload contains sensitive information comprises the steps of:

said gateway device determining a standard for a format of said nonencrypted message packet;

based on said standard, said gateway device determining a location of data within said nonencrypted message packet; and said gateway device determining a type of said data at said location and whether said type is sensitive.

5. A method as set forth in claim 1 wherein said payload contains sensitive information, and in response, said gateway device initiating encryption of said nonencrypted message packet and further comprising the subsequent step of routing the encrypted message packet via a nonsecure communication path toward an intended destination of said nonencrypted message packet.

6. A method as set forth in claim 1 wherein said payload does not contain sensitive information, and in response, said gateway device routing said nonencrypted message packet via a nonsecure communication path toward an intended destination of said nonencrypted message packet without encryption of said nonencrypted message packet.

7. A system for routing, said system comprising:

a CPU, a computer-readable memory and a computer-readable tangible storage device;

first program instructions to receive a nonencrypted message packet, and in response, read a payload in said nonencrypted message packet to determine if said payload contains sensitive information;

second program instructions, responsive to said payload containing sensitive information, to initiate encryption of said nonencrypted message packet;

an encryption device, responsive to the initiation of said encryption of said nonencrypted message packet, to encrypt said nonencrypted message packet and initiate routing of the encrypted message packet toward an intended destination of said nonencrypted message packet via a nonsecure communication path; and third program instructions, responsive to said payload not containing sensitive information, to initiate routing of said nonencrypted message packet toward said intended destination via a nonsecure communication path without encryption of said nonencrypted message packet; and wherein said first program instructions determine if said payload contains a login credential, said first program instructions determine that said payload contains sensitive information if said payload contains a login credential; and said first, second and third program instructions are stored on said computer-readable tangible storage device for execution by said CPU via said computer-readable memory.

8. A system as set forth in claim 7 wherein:

said first program instructions receive another, encrypted message packet, and in response, initiate routing of said other message packet toward an intended destination of said other message packet via a nonsecure communication path without further encryption of said other message packet.

9. A system as set forth in claim 7 wherein the encryption of said nonencrypted message packet occurs in a virtual private network, and said second program instructions, responsive to said payload containing sensitive information, forward said nonencrypted message packet to said virtual private network for encryption.

10. A system as set forth in claim 7 wherein said first program instructions comprise:

fourth program instructions to determine a standard for a format of said nonencrypted message packet;

fifth program instructions, based on said standard, to determine a location of data within said nonencrypted message packet; and sixth program instructions to determine a type of said data at said location and whether said type is sensitive; and wherein said fourth, fifth and sixth program instructions are stored in said computer-readable tangible storage device for execution by said CPU via said computer-readable memory.

11. A computer program product for routing, said computer program product comprising:

a computer-readable tangible storage device;

first program instructions to receive a nonencrypted message packet, and in response, read a payload in said nonencrypted message packet to determine if said payload contains sensitive information;

second program instructions, responsive to said payload containing sensitive information, to initiate encryption of said nonencrypted message packet for subsequent routing of the encrypted message packet toward an intended destination of said nonencrypted message packet via a nonsecure communication path; and third program instructions, responsive to said payload not containing sensitive information, to initiate routing of said nonencrypted message packet toward said intended destination via a nonsecure communication path without encryption of said nonencrypted message packet; and wherein said first program instructions determine if said payload contains a login credential, said first program instructions determine that said payload contains sensitive information if said payload contains a login credential; and said first, second and third program instructions are stored on said computer-readable tangible storage device.

12. A computer program product as set forth in claim 11 further comprising:

fourth program instructions to receiving another, encrypted message packet, and in response, initiate routing of said other message packet toward an intended destination of said other message packet via a nonsecure communication path without further encryption of said other message packet; and wherein said fourth program instructions are stored on said computer-readable tangible storage device.

13. A computer program product as set forth in claim 11 wherein said encryption of said nonencrypted message packet is executed in a virtual private network, and said second program instructions, responsive to said payload containing sensitive information, initiate forwarding of said nonencrypted message packet to said virtual private network for encryption.

14. A computer program product as set forth in claim 11 wherein said first program instructions comprise:

fourth program instructions to determine a standard for a format of said nonencrypted message packet;

fifth program instructions, based on said standard, to determine a location of data within said nonencrypted message packet; and sixth program instructions to determine a type of said data at said location and whether said type is sensitive; and wherein said fourth, fifth and sixth program instructions are stored on said computer-readable tangible storage device.

* * * * *